(12) United States Patent
Huang et al.

(10) Patent No.: US 6,636,656 B2
(45) Date of Patent: Oct. 21, 2003

(54) SYSTEM ARCHITECTURE OF OPTICAL SWITCHING FABRIC

(75) Inventors: Cheng-Chung Huang, Sunnyvale, CA (US); Steven S. Nasiri, Saratoga, CA (US); Alex Harwit, San Mateo, CA (US); Dmitry Vasily Bakin, San Jose, CA (US); Randall Brian Sprague, Carnation, WA (US); Janusz Bryzek, Fremont, CA (US)

(73) Assignee: Transparent Networks, Inc., Santa Clara, CA (US)

( * ) Notice: Subject to any disclaimer, the term of this patent is extended or adjusted under 35 U.S.C. 154(b) by 91 days.

(21) Appl. No.: 10/002,310

(22) Filed: Oct. 24, 2001

(65) Prior Publication Data

US 2003/0174928 A1 Sep. 18, 2003

(51) Int. Cl.[7] .................................................. G02B 6/26
(52) U.S. Cl. ............................ 385/18; 385/17; 385/24; 359/224
(58) Field of Search .............................. 385/16–23, 24; 359/128, 223–226, 290, 291

(56) References Cited

U.S. PATENT DOCUMENTS 6,320,993 B1 * 11/2001 Laor ........................... 385/16
6,483,962 B1 * 11/2002 Novotny ...................... 385/18
2002/0186918 A1 * 12/2002 Burroughs ................... 385/18
2002/0191901 A1 * 12/2002 Jensen ......................... 385/24

* cited by examiner

Primary Examiner—Hemang Sanghavi

(57) ABSTRACT

An optical switching fabric enables an optical signal entering the device on any one of multiple input ports to be directed to any one of multiple output ports. The present optical switching fabrics include sensing and monitoring devices that permit precise initial calibration and continuous switch connection status monitoring and control. Light entering the switching fabric on an input port is reflected by one of a first set of individually controllable mirrors to one of a second set of individually controllable mirrors and then to a corresponding output port. The switching fabrics include control lasers and position sensing devices which provide output signals corresponding to the orientations of the mirrors. In addition, a subset of the input ports and output ports can be attached to monitor light sources and detectors for recalibration and control. Further, sensors for detecting the intensity of input signals, of signals that have been reflected by a mirror in the first set and by a mirror in the second set, and of signals backscattered from the output ports may be included.

13 Claims, 1 Drawing Sheet

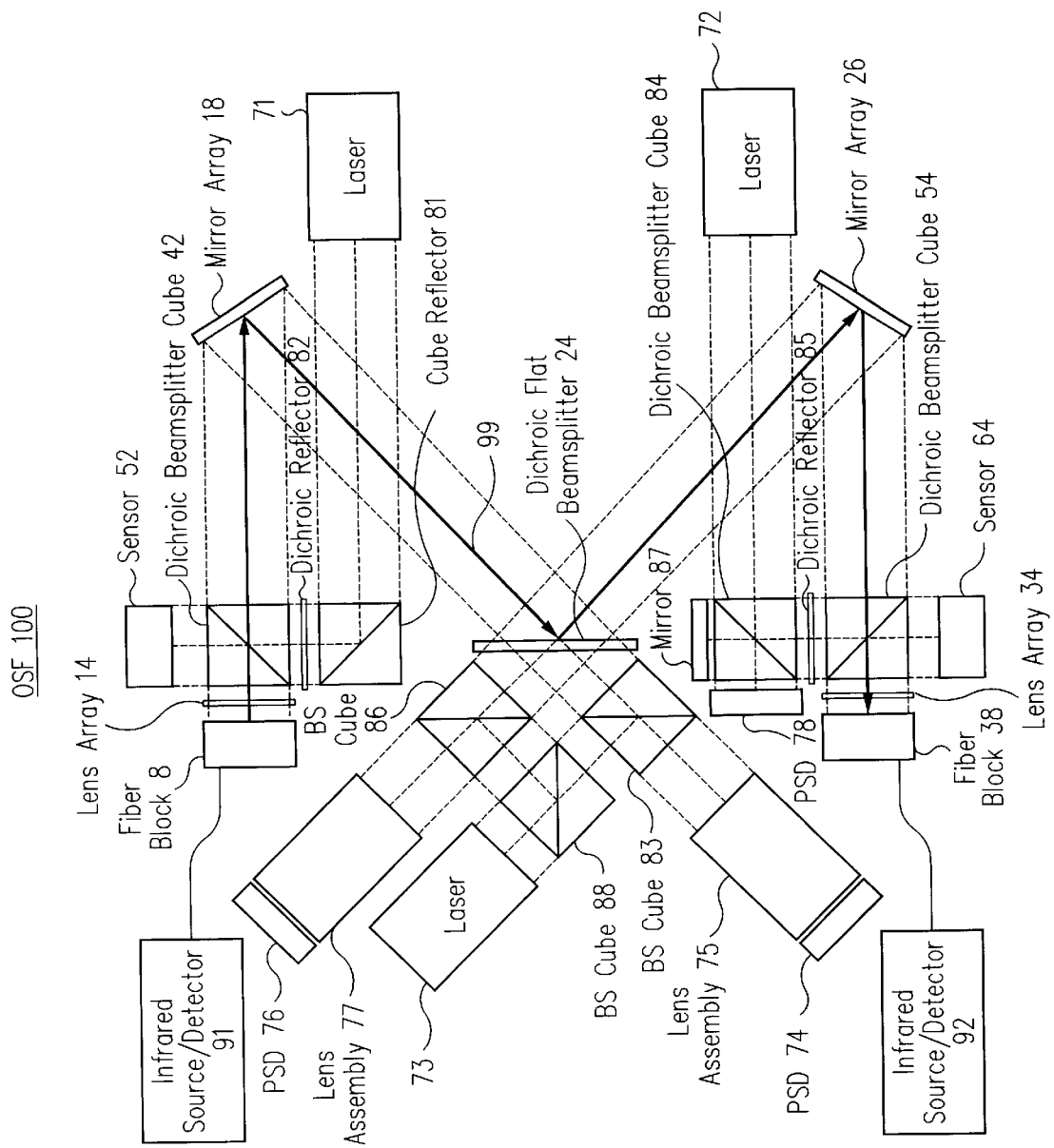

SYSTEM ARCHITECTURE OF OPTICAL SWITCHING FABRIC

CROSS REFERENCE TO RELATED APPLICATIONS

This application is related to the following co-filed, commonly assigned, U.S. patent applications: Ser. No. 09/999,878, Ser. No. 09/999,610, Ser. No. 09/999,705, and Ser. No. 10/003,659, all of which are incorporated herein by reference. This application is also related to U.S. patent application Ser. No. 09/779,189 entitled "A Microelectromechanical Mirror," filed Feb. 7, 2001, assigned to the assignee of the present invention, and incorporated herein by reference.

FIELD OF THE INVENTION

This invention relates generally to switches for optical networks and in particular to optical switching fabrics with tilting mirrors.

BACKGROUND

As optical fiber progressively supplements and replaces metal wire as the backbone of telecommunications networks, the switches that route optical signals have emerged as a significant bottleneck. Transmission systems move information as optical photons but the switching systems and so-called crossconnect fabrics that switch, route, multiplex, and demultiplex optical signals have generally been electronic. Electronic switching requires light to be converted to an electronic signal to pass through the switch and then be reconverted to light in a process termed optical-electronic-optical (OEO) conversion that introduces both time delay and cost.

There is great interest in the telecommunications industry, therefore, in developing all optical switching to avoid the necessity of multiple OEO conversions. On long haul networks, ten's or hundred's of individual wavelengths, each carrying a signal, are multiplexed onto each fiber. Switches are desired that provide all optical switching at the fiber level, the wavelength level, or at both levels. As described, for example, by Bishop et al. in *Scientific American* (January, 2001, pp 88–94), all optical switches based on a number of underlying technologies including Micro Electro Mechanical Systems (MEMS) tilting mirrors, thermo-optical devices, bubbles formed by inkjet printing heads, and liquid crystals, have been proposed. Optical fiber switches based on MEMS mirrors are particularly attractive because they can incorporate very large scale integrated circuits and can be robust, long-lived, and scalable.

An optical fiber switch described in U.S. Pat. No. 5,960,132 to Lin, for example, includes an array of hinged MEMS mirrors, each of which can be rotated about its hinge to reflect or not reflect light in a certain direction. An array of $N^2$ such mirrors is required to switch signals carried by N input optical fibers from one to another of N output optical fibers. Unfortunately, $N^2$ scaling results in unmanageably complex systems for large N.

Another optical fiber switch described in Bishop et al., cited above, as well as in Bishop et al., Photonics Spectra (March 2000, pp. 167–169) includes an array of MEMS mirrors disposed on a single surface. Each mirror tilts independently to direct light received from an array of input/output optical fibers via a folding flat to any other mirror and thus to any input/output fiber. No internal optical diagnostics for this switch have been described in publications to date.

Still other optical fiber switches are based on two arrays of MEMS mirrors that can be tilted in any direction. Incoming light is directed onto a mirror in the first array which deflects it onto a predetermined mirror in the second array. The mirror in the second array, in turn, directs the lights to the predetermined output port. In these so-called, 2N configurations, the position of the mirrors has to be controlled very precisely, to small fractions of degrees to provide the desired connections.

Optical fiber switches having a low insertion loss and that can be finely tuned to cross-connect large numbers of input and output fibers would further the development of fiber optic telecommunications networks.

SUMMARY

An optical switching fabric is an optical switch with multiple input ports and multiple output ports that allows an optical signal entering the device on any input port to be directed to any output port. Optical switching fabrics according to embodiments of the present invention include sensing and monitoring devices that enable precise initial calibration and continuous switch connection status monitoring and control.

The present optical switching fabrics include, therefore, multiple input ports, multiple output ports, a first set of multiple mirrors disposed on a first surface, typically in the form of an array, a second set of multiple mirrors disposed on a second surface, typically in the form of an array, and a dichroic beamsplitter. Each one of the first set of mirrors is individually controllable to direct light from a corresponding one of the input ports to any one of the second set of mirrors, via the dichroic beamsplitter. Each one of the second set of mirrors is individually controllable to direct light, incident on it from one of the mirrors in the first set of mirrors, to a corresponding one of the output ports.

Switching fabrics according to an embodiment of the present invention further include control light sources, which provide light beams separate from the signal carrying light beams, and position sensing detectors, which enable the positions of the mirrors to be detected and controlled when no signal light is present in the switching fabric. The control devices include a first control light source located to illuminate the first set of mirrors and a first position sensing detector located to detect light from the first control light source that has been reflected by the first set of mirrors. The signals provided by the first position sensing detector correspond to the positions of the first set of mirrors.

In addition, such switching fabrics include a second control light source positioned to illuminate the second set of mirrors and a second position sensing detector positioned to detect the reflected control light such that signals from the second position sensing detector correspond to the positions of the second set of mirrors. A third position sensing detector may be positioned to detect control light that has been reflected by the first set of mirrors and the second set of mirrors. The control light sources provide light at a different wavelength than the wavelength of the optical signals directed by the switching fabric.

According to another aspect of the present invention, the switching fabric includes a first sensor positioned to detect the intensity of light entering the switching fabric from the input ports. A beamsplitting cube may be included in the optical path between the input ports and the first set of mirrors to deflect a small portion of the input light to the first sensor. A second sensor located to detect the intensity of light backscattered from the output ports is also included.

When the output light is properly aligned on the output ports, the backscattered light is at a minimum. Infrared cameras are useful as the first and second sensors. By including suitably oriented optical reflectors, the intensity of light from the input ports that has been reflected by the first set of mirrors and by the second set of mirrors can be detected on the second sensor and the intensity of backscattered light that has been deflected by the second set of mirrors and then by the first set of mirrors can be detected on the first sensor. The optical switching fabric may also be controlled according to the signals from these two sensors.

According to yet another aspect of the present invention, a subset of the input ports and a subset of the output ports are dedicated as monitor channels. The switching fabric is configured to direct light from the monitor input ports to the monitor output ports via the first set of mirrors and the second set of mirrors. One or more monitor light sources that emit light at a wavelength similar to the wavelengths of the optical signals controlled by the switching fabric are attached to the monitor input channels and one or more monitor detectors are attached to the monitor output ports. The monitor source(s) and detector(s) provide continuous information about the status of the switching fabric without the need for signal wavelengths to be present. Further, one or more light sources can be combined with one or more detectors at both the monitor input ports at the monitor output ports to also detect the passage of light through the system in the opposite direction from the output ports to the input ports.

The optical switching fabric is controlled by an optical switching fabric controller using alignment look-up tables that are determined during an initial factory calibration process. Periodically, the alignment look-up tables can be recalibrated using the monitor light sources and detectors. A calibration correction to all channels through the switching fabric can be computed from the correction determined for the monitor channels.

BRIEF DESCRIPTION OF THE DRAWING

The FIGURE is a schematic illustration of an optical switching fabric according to embodiments of the present invention.

DETAILED DESCRIPTION

An optical switching fabric according to embodiments of the present invention includes sensing and monitoring devices to enable precise initial calibration and continuous monitoring and control of switch performance.

A schematic diagram of an optical switching fabric (OSF) 100 is shown in the FIGURE. Conceptually, OSF 100 is a device with multiple input ports and multiple output ports that allows an optical signal entering the device on any input port to be directed to any output port. The design of OSF 100 can be implemented with tens, hundreds, or one or more thousands of input ports and output ports. In one example, the number of input ports is equal to the number of output ports and is on the order of a thousand.

A number of individual input fibers (not shown) carrying optical signals are attached to OSF 100 at input fiber block 8. The number of input ports is greater than or equal to the number of individual input fibers. Similarly, output fiber block 38 is attached to a number of individual output fibers (not shown) carrying optical signals from OSF 100. The number of output ports is greater than or equal to the number of individual output fibers. For telecommunication applications, the signal light carried by the input optical fibers typically has wavelengths near about 1310 nanometers (nm) or about 1550 nm.

OSF 100 includes a first array 18 and a second array 26 of micro mirrors. Each micro mirror in the arrays of micro mirrors can be individually tilted along two perpendicular axes. OSF 100 is configured such that light entering the switch on a particular input fiber is incident on a corresponding mirror in the first mirror array 18, and light incident on a particular mirror on the second mirror array 26 is directed to a corresponding output fiber. Thus, OSF 100 is an example of a 2N configuration switching fabric. OSF 100 further includes an input lens array 14, which nearly collimates the light emerging from the input fibers to parallel beams incident on mirror array 18, a dichroic flat beam splitter 24, and an output lens array 34 which focuses light reflected from the second mirror array 26 onto the cores of the output fibers connected to output block 38.

To direct an optical signal from a particular input fiber to a chosen output fiber, the mirror on first mirror array 18 corresponding to the particular input fiber is oriented to direct light to the mirror on the second mirror array 26 corresponding to the chosen output fiber via reflection by the dichroic beam splitter 24. The complete optical path through OSF 100 from the input fiber block to the output fiber block is indicated by reference 99 in the FIGURE. OSF 100 operates under the control of an optical switching fabric controller (not shown) which controls the orientation of the micro mirrors to provide the desired connections.

OSF 100 further includes sensors that provide information about incoming and outgoing light beams and a control system, using control light beams routed through the system, to record and control the positions of the micro mirrors. Sensors 52 and 64 are positioned near input fiber block 8 and output fiber block 38, respectively, to monitor the intensities of input signal light, of signal light that has traversed the system, and of signal light reflected off fiber block 38 after being routed through the system.

When OSF 100 is well aligned, the light beams reflected by second mirror array 26 are focussed by the lens array 34 to the approximate centers of the cores of the selected output fibers. The intensity of the light beam backreflected off fiber block 38 is at a local minimum when the light is well positioned and increases if the light beam focus falls instead on the cladding of the output fiber or on the output fiber block 38 near the output fiber. The cladding material and the fiber block are more reflective than the core material. If the input beams are known to be well aligned, minimized reflected intensities verify that output signals are present on output fibers. Moreover, the intensity of a reflected light beam is also high if the corresponding output optical fiber is broken. Thus, detection of reflected light allows output fiber fault detection.

Sensors 52 and 64, which are capable of resolving the intensity of light from individual fibers, provide electrical signals corresponding to the detected intensities to the optical switching fabric controller. Typically infrared cameras are used for sensors 52 and 64. To monitor the input light intensity, a portion, typically about 1–2%, of the input infrared light is deflected at a dichroic beam splitter cube 42 to input sensor 52. To monitor the light intensity near the output end of OSF 100, a similar portion of the-signal light that has passed through the system, having been deflected by first mirror array 18, dichroic flat beamsplitter 24, and second mirror array 26, is deflected by a dichroic beamsplitter cube 54 to a dichroic reflector 85. Dichroic reflector 85, which is highly reflective to infrared wavelengths, reflects the beams to sensor 64.

Sensor 64 also detects light backreflected from the ends of output fibers or from fiber block 38. The reflected light is deflected by dichroic beam splitter cube 54 to sensor 64. By tilting dichroic reflector 85, the spots formed on sensor 64 by light that has traversed the entire optical system is displaced from the spots formed on sensor 64 by back reflected light, allowing two types of measurements with one sensor element. In addition to detecting input signal light, sensor 52 also detects backreflected light from output fiber block 38 that has traversed the optical system in the opposite direction, having been deflected first by second mirror array 26, then by dichroic flat beamsplitter 24 and then by first mirror array 18. A small portion of the back reflected light is deflected by dichroic beam splitter cube 42 to a dichroic reflector 82 which reflects the light beams to sensor 52. Like dichroic reflector 85, dichroic reflector 82 is tilted to separate the signals from the input beams and from the backreflected beams on sensor 52.

The elements used to control OSF 100 also include control lasers that emit at a wavelength distinct from the signal wavelengths. Position sensing detectors respond to the control laser wavelength. The output of the position sensing detectors is indicative of the positions of the micro mirrors. The control laser beams pass through the optical system on much the same beam path as that of the signal beams. Including the control lasers and the position sensing detectors allows micro mirror positions to be determined when no signal light is present in the switching fabric.

A light beam from a first control laser 71 is deflected by a cube reflector 81 through dichroic reflector 82 to dichroic beamsplitter cube 42 which deflects the beam onto the first mirror array 18, illuminating the entire mirror array. Dichroic reflectors 82 and 85 are highly transmissive to light at the wavelength of the control lasers. The individual beams deflected by the micro mirrors in array 18 pass through dichroic flat beam splitter 24, pass through a beamsplitter cube (BS) 83, and are focussed by a first lens assembly 75 onto a first position sensing detector 74. The output signals of first position sensing detector (PSD) 74, which are indicative of the positions of the micro mirrors in the first mirror array 18, are electrically connected to the optical switching fabric controller. First control laser 71 and first position sensing detector 74 enable first mirror array 18 to be positioned with about 9 bit accuracy. That is, about $2^9$ positions of each micro mirror can be distinguished from each other in each of two directions.

In an analogous optical path, a light beam from a second control laser 72 is deflected by a dichroic beamsplitter cube 84 through dichroic reflector 85 to dichroic beamsplitter cube 54 which deflects the beam onto the second mirror array 26, illuminating the entire mirror array. The individual beams deflected by the micro mirrors in array 26 pass through dichroic flat beam splitter 24, pass through a beamsplitter cube 86, and are focussed by a second lens assembly 77 onto a second position sensing detector 76. The output signals of second position sensing detector 76, which are indicative of the positions of the micro mirrors in the second mirror array 26, are electrically connected to the optical switching fabric controller. Second control laser 72 and second position sensing detector 76 enable second mirror array 26 to be positioned with about 9 bit accuracy.

Inclusion of a third position sensing detector 78 that detects light from first control laser 71 that has been deflected by both mirror arrays enables high precision alignment and control of OSF 100. As described above, the first position sensing detector 74 detects the portion of the control beams deflected by first mirror array 18 and passed through dichroic flat beamsplitter 24. The other portion of the control beams striking dichroic flat beamsplitter 24 is deflected onto the second mirror array 26. Mirror array 26 deflects the control beams onto dichroic beam splitter cube 54 which deflects them through dichroic reflector 85. A portion of the control beams passes through dichroic beamsplitter cube 84 to a mirror 87 which retroreflects the beams to dichroic beamsplitter cube 84 which deflects them onto the third position sensing detector 78. The output signals from detector 78 are electrically connected to the optical switching fabric controller. Since the control laser beams have been deflected by both mirror arrays before reaching the third position sensing detector 78, and since there is no lens assembly in front of detector 78, detector 78 is very sensitive to small mirror displacements in both mirror arrays 18 and 26 and therefore provides high resolution control of OSF 100. Even though detector 78 has the same spatial resolution as detectors 74 and 76, the optical configuration enables OSF 100 to be controlled with 12 bit accuracy; that is using the third position sensing detector to distinguish three additional bits of resolution. Thus $2^{12}$ positions of the optical path can be distinguished.

To provide a check on any variation over time of the signals provided by the position sensing detectors due to environmental factors, OSF 100 may also include reference beams that strike the position sensing detectors without being deflected by the mirror arrays. A third laser 73, which provides light at much the same wavelength as control lasers 71 and 72, provides the reference beams for first position sensing detector 74 and second position sensing detector 76. A portion of the light emitted by third laser 73 passes through a beamsplitter cube 88 and is deflected by beamsplitter cube 83 onto first position sensing detector 74 via first lens assembly 77. A portion of the light from third laser 73 is deflected by beamsplitter cube 88 onto beamsplitter cube 86 which deflects the light onto the second position sensing detector 76 via the second lens assembly 75. The portion of light from second control laser 72 passing through beamsplitter cube 84 provides the reference beam for third position sensing detector 78. Note that at each position sensing detector, the control beam and the reference beam are provided from a different laser. Therefore, by pulsing the lasers and interleaving them in time, a difference signal may be obtained, for each position sensing detector at the position corresponding to each fiber, as the difference between the control signal and the reference signal. The difference signal compensates for any variation in detector output.

In order to provide continuous monitoring of the connection status through the optical switching fabric, a small number of input ports and a small number of output ports can be dedicated as monitor channels. OSF 100 may include infrared source/detector 91 connected to the monitor channels at input fiber block 8 and infrared source/detector 92, connected to the monitor channels at output fiber block 38. OSF 100 is controlled to create optical paths between the monitor input ports and the monitor output ports.

Infrared source/detector 91 and 92 provide a measure of the optical throughput through the entire system in two directions. The signals provided to the monitor channels by infrared source/detector 91 are detected by infrared source/detector 92 and vice versa. The signals from infrared source/detector 91 and 92 are electrically connected to the optical switching fabric controller. Infrared source/detector 91 and 92 also provide information about the status of OSF 100 without the need for signal wavelengths to be present. Furthermore, the results of optical throughput obtained for the dedicated monitor channels using infrared source/ detectors 91 and 92 can be correlated with the output of sensors 52 and 64 which provide data for all optical paths through OSF 100 including the monitor channels.

The sensors, control lasers, and position sensing devices described above are used for calibration and control of the optical switching fabric according to the present invention. OSF 100 is controlled by the optical switching fabric controller using alignment look-up tables. The look-up tables record signals corresponding to the positions registered on the position sensing detectors when the mirror arrays are optimally aligned to direct light from particular input ports to particular output ports. The alignment look-up tables are initially determined by a factory calibration process in which a source of infrared light at a telecommunication frequency is temporarily provided to all the input ports at input fiber block 8 and an infrared detector is temporarily connected to all the output ports at output fiber block 38. For every combination of input port to output port, the positions of the micro mirrors in both the micro mirror arrays are varied to maximize the intensity of the infrared light transmitted through the system. Signals corresponding to the positions recorded by the position sensing detectors at the mirror configuration of maximum infrared intensity are recorded in the alignment look-up tables.

To operate OSF 100 to connect particular input ports to particular output ports, the micro mirrors are adjusted by actuators incorporated in the mirror arrays according to the alignment look-up tables. Over time, the relative positions of optical elements of OSF 100 may vary, due to, for example, vibrations, or changes in temperature. Periodically, the alignment look-up tables may be recalibrated using the infrared source/detectors 91 and 92. For all connections between the monitor channels, the mirror positions are varied to maximize infrared intensity transmitted through the system. A calibration correction to all channels through OSF 100 is computed from the correction determined for the monitor channels.

Information from sensors 52 and 64 is also provided to the optical switching fabric controller and may be used in controlling OSF 100. The calibration and control of the present optical switching fabric and the optical switching fabric controller are further described in U.S. Patent Applications Ser. No. 09/999,878, Ser. No. 09/999,610, and Ser. No. 09/999,705. The control of individual mirrors is further described in Ser. No. 10/003,659.

The micro mirror arrays 18 and 26 may be composed of freely tiltable microelectro-mechanical mirrors actuated by, for example, electrostatic, electromagnetic, piezoelectric, or thermal actuators. Such micro mirrors are further described in U.S. patent application Ser. No. 09/779,189. Input fiber block 8 and output fiber block 38 rigidly position the input and output fibers respectively in a two-dimensional array. Various implementations of the fiber blocks are described in U.S. Application Ser. No. 09/866,063.

The sensors, lasers, and optical elements described above are available commercially and/or known to those skilled in the art. For example, input lens array 14 and output lens array 34 may be formed from fused silica, optical glass, silicon, plastic, or epoxy. Suitable lens arrays are available, for example, from Corning Rochester Photonics Incorporated (Rochester, N.Y.) The elements of lens assemblies 75 and 77 may be purchased off the shelf from companies such as Coherent Auburn Division (Auburn, Calif.) Dichroic flat beam splitter 24 is typically a device that transmits about 30% to about 99% of light having a wavelengths between about 600 and 1000 nm and reflects greater than about 90%, preferably greater than about 98%, of incident infrared light having a wavelength of about 1200 to about 1700 nm. Beamsplitter cubes 83 and 86 are typically formed from BK 7 optical glass having a dielectric coating with a reflectivity of about 2% at infrared wavelengths. Cube 88 has a reflectivity of about 50% for control light. Dichroic beamsplitter cubes 42, 54, and 84 are typically formed from BK 7 glass with a dielectric coating having a reflectivity of about 2% at infrared wavelengths and a reflectivity of about 40% to about 99% at wavelengths of about 600 nm to about 1000 nm. Such beamsplitters are available, for example, from Harold Johnson Optical Laboratories, Inc. (Gardena, Calif.) and suitable coatings may be obtained from ZC&R Coatings for Optics, Inc. (Torrance, Calif.)

As described above, infrared cameras may serve as sensors 52 and 64. For example, a model SU128-1.7RT infrared camera provided by Sensors Unlimited, Inc. (Princeton, N.J.) may be used. Infrared source/detectors 91 and 92 may be comprised of conventional semiconductor laser diodes capable of operating at wavelengths of about 1310 nm or about 1550 nm, conventional InGaAs photodiodes capable of detecting the above frequencies, and conventional 1×2 tap couplers to couple a laser and a detector into a single fiber. Tap couplers are available for example from Oplink Communications (San Jose, Calif.). Control lasers 71, 72, and 73 emit light at wavelengths other than those used for telecommunication signals. For example, control lasers 71, 72, and 73 are conventional laser diodes that emit light having a wavelength of about 660 nm or about 810 nm. Suitable laser diodes are available, for example from SDL, Inc. (San Jose, Calif.) Position sensing detectors 74, 76, and 78 are, for example, two dimensional arrays of quadrant cell photodiodes bonded to a glass wafer. Such quadrant cell photodiodes are provided, for example, by OSI Fibercomm, Inc. (Hawthorne, Calif.) Dichroic reflectors 82 and 85 are conventional dichroic optical elements that are highly reflective to infrared wavelengths and highly transmissive to the control laser wavelengths. The optical elements and sensors in OSF 100 are further described in U.S. Patent Applications Ser. No. 09/999,878 and Ser. No. 09/999,610.

Although the invention has been described with reference to particular optical components, sensors, and optical signal paths, the description is only an example of the invention's application and should not be taken as a limitation. Additional, fewer, or different optical components or light sources may be used in different optical configurations, as known to those skilled in the art. For example, the placement of the control lasers in relation to the micro mirror arrays may be varied. In the present configuration, control lasers are directed to the mirror arrays by beamsplitter cubes and the light reflected by the mirror arrays passed through the dichroic flat beamsplitter to the position sensing detectors. Alternatively, the control lasers may be placed such that the control beams pass through the dichroic flat beamsplitter before striking the mirror arrays. Examples of the latter configurations are described in U.S. Patent Applications Ser. No. 09/999,878 and Ser. No. 09/999,610. All such adaptations and combinations of the features disclosed are within the scope of the invention as defined by the following claims.

We claim:

1. An optical switch comprising:
   a first plurality of ports;
   a second plurality of ports;
   a first plurality of mirrors disposed on a first surface;
   a second plurality of mirrors disposed on a second surface;

a dichroic optical element,
  wherein each one of the first plurality of mirrors is individually controllable to direct light incident from a corresponding one of the first plurality of ports to any one of the second plurality of mirrors via the dichroic optical element, and
  wherein each one of the second plurality of mirrors is individually controllable to direct to a corresponding one of the second plurality of ports, light incident from any one of the first plurality of mirrors;
a first light source located to illuminate the first plurality of mirrors with control light;
a first position sensing detector located to detect control light that has been reflected by the first plurality of mirrors, wherein signals provided by the first position sensing detector correspond to orientations of the first plurality of mirrors;
a second light source located to illuminate the second plurality of mirrors with control light; and
a second position sensing detector located to detect control light that has been reflected by the second plurality of mirrors, wherein signals provided by the second position sensing detector correspond to orientations of the second plurality of mirrors.

2. The optical switch of claim 1, further comprising:
a third position sensing detector located to detect control light that has been reflected by the first plurality of mirrors and by the second plurality of mirrors, wherein signals provided by the third position sensing detector correspond to orientations of both the first plurality of mirrors and the second plurality of mirrors.

3. The optical switch of claim 2, wherein the third position sensing detector has the same spatial resolution as the first position sensing detector, and wherein the signals provided by the third position sensing detector correspond to orientations of both the first plurality of mirrors and the second plurality of mirrors with a finer resolution of the orientations than the correspondence of the signal from the first position sensing detector to the orientations of the first plurality of mirrors.

4. The optical switch of claim 2, further comprising a third light source located to illuminate the first position sensing detector and the second position sensing detector with control light that has not been reflected by the first plurality of mirrors or by the second plurality of mirrors.

5. The optical switch of claim 2 wherein the first position sensing detector is located to detect control light that has been reflected by the first plurality of mirrors and that has passed through the dichroic optical element, and wherein the second position sensing detector is located to detect control light that has been reflected by the second plurality of mirrors and that has passed through the dichroic optical element.

6. An optical switch comprising:
a first plurality of ports;
a second plurality of ports;
a first plurality of mirrors disposed on a first surface;
a second plurality of mirrors disposed on a second surface;
a dichroic optical element,
  wherein each one of the first plurality of mirrors is individually controllable to direct light incident from a corresponding one of the first plurality of ports to any one of the second plurality of mirrors via the dichroic optical element, and
  wherein each one of the second plurality of mirrors is individually controllable to direct to a corresponding one of the second plurality of ports, light incident from any one of the first plurality of mirrors;
a first sensor located to detect the intensity of light incident from the first plurality of ports that has not been reflected by the first plurality of mirrors or by the second plurality of mirrors; and
a second sensor located to detect the intensity of light backscattered into the switch from the second plurality of ports.

7. The optical switch of claim 6, further comprising an optical reflector located to direct light incident from the first plurality of ports that has been reflected by the first plurality of mirrors and by the second plurality of mirrors onto the second sensor at positions distinct from the positions at which the backscattered light is detected.

8. The optical switch of claim 6, further comprising an optical reflector located to direct light that has been backscattered into the switch from the second plurality of ports and that has been reflected by the second plurality of mirrors and by the first plurality of mirrors onto the first sensor at positions distinct from the positions at which the light from the first plurality of ports is detected.

9. The optical switch of claim 8 wherein the first plurality of mirrors and the second plurality of mirrors are controlled based in part on signals received from the first sensor and the second sensor.

10. An optical switch comprising:
a first plurality of ports;
a second plurality of ports;
a first plurality of mirrors disposed on a first surface;
a second plurality of mirrors disposed on a second surface;
a dichroic optical element,
  wherein each one of the first plurality of mirrors is individually controllable to direct light incident from a corresponding one of the first plurality of ports to any one of the second plurality of mirrors via the dichroic optical element, and
  wherein each one of the second plurality of mirrors is individually controllable to direct to a corresponding one of the second plurality of ports, light incident from any one of the first plurality of mirrors;
a first monitor device connected to a subset of the first plurality of ports, the first monitor device comprising a light source; and
a second monitor device connected to a subset of the second plurality of ports, the second monitor device comprising a photodetector,
  wherein a subset of the first plurality of mirrors and a subset of the second plurality of mirrors are controlled such that light emitted from the first monitor device is detectable by the second monitor device.

11. The optical switch of claim 10, wherein the first monitor device further comprises a photodetector, wherein the second monitor device further comprises a light source, and wherein light emitted from the second monitor device is detectable by the first monitor device.

12. The optical switch of claim 11 wherein the first plurality of mirrors and the second plurality of mirrors are controlled based on signals received from at least one of the first monitor device and the second monitor device.

13. The optical switch of claim 10 wherein the first plurality of mirrors and the second plurality of mirrors are controlled based on signals received from at least one of the first monitor device and the second monitor device.

* * * * *